United States Patent [19]

Brewer

[11] 4,206,718

[45] Jun. 10, 1980

[54] ANIMAL LITTER PROCESS

[75] Inventor: Andrew I. Brewer, Long Beach, Calif.

[73] Assignee: Star-Kist Foods, Inc., Terminal Island, Calif.

[21] Appl. No.: 547,118

[22] Filed: Feb. 5, 1975

Related U.S. Application Data

[63] Continuation-in-part of Ser. No. 348,053, Apr. 5, 1973, abandoned.

[51] Int. Cl.² .............................................. A01K 29/00
[52] U.S. Cl. ................................................... 119/1
[58] Field of Search ............................................ 119/1

[56] References Cited

U.S. PATENT DOCUMENTS

| | | | |
|---|---|---|---|
| 2,179,591 | 11/1939 | Godchaux | 119/1 |
| 3,420,671 | 1/1969 | Hess et al. | 426/147 |
| 3,789,797 | 2/1974 | Brewer | 119/1 |
| 3,923,005 | 12/1975 | Fry et al. | 119/1 |

Primary Examiner—Jay N. Eskovitz
Assistant Examiner—Peter K. Skiff
Attorney, Agent, or Firm—Fulwider, Patton, Reiber, Lee & Utecht

[57] ABSTRACT

A process of preparing litter for absorbing and neutralizing the odors of animal waste matter from a mixture of alfalfa and gelatinizable carbohydrate such as a flour.

20 Claims, 1 Drawing Figure

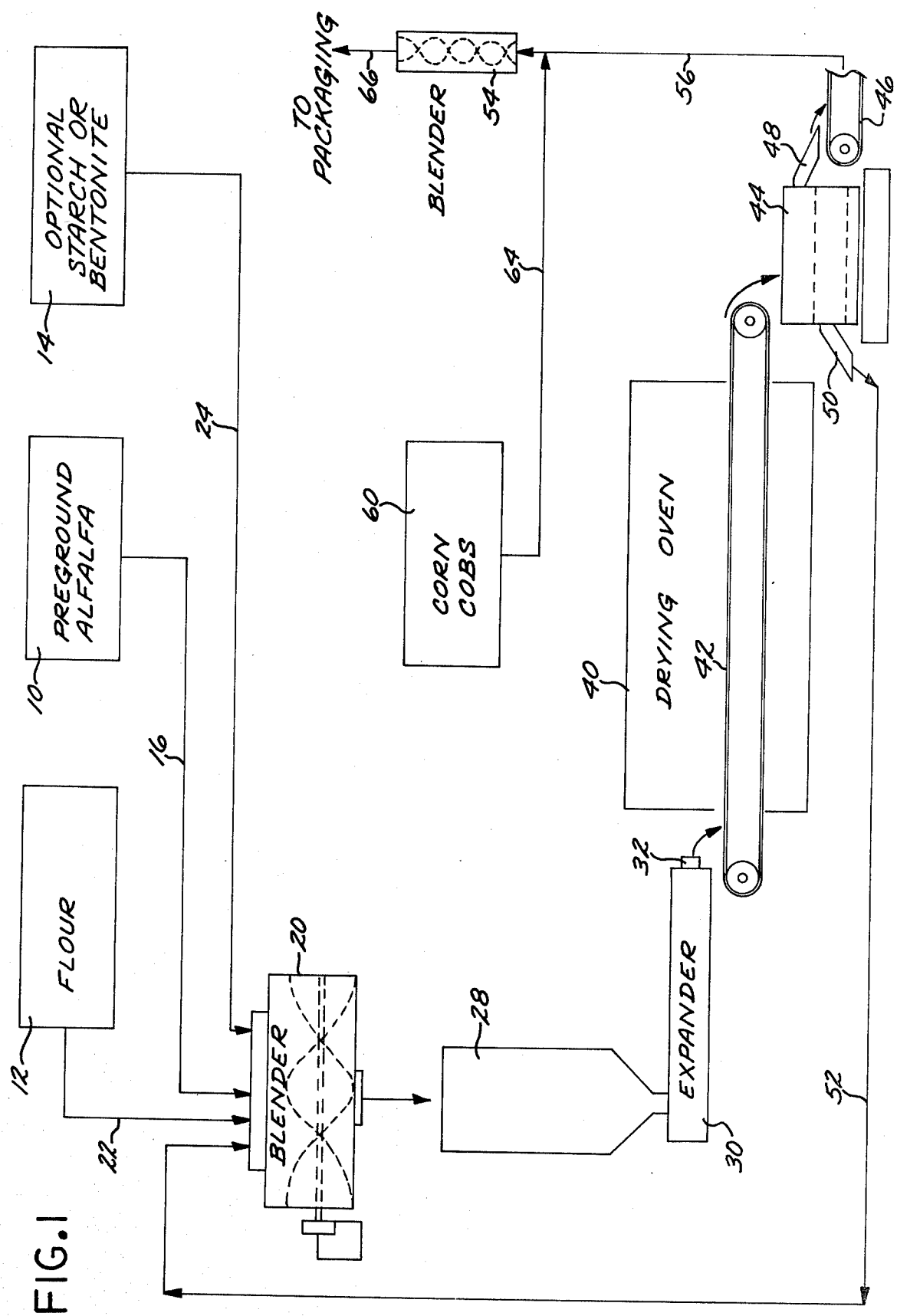

ANIMAL LITTER PROCESS

REFERENCE TO RELATED APPLICATIONS

This application is a continuation-in-part of my copending application, Ser. No. 348,053, filed Apr. 5, 1973, now abandoned.

BACKGROUND OF THE INVENTION

Animal litter prepared particularly for household pets have been marketed for many years. A widely utilized type of animal litter employs lightweight material, generally of clay and/or fibrous products. Such material, however, tends to adhere to the paws or fur of the animal and accordingly is tracked from the litter area to the surrounding household area. Moreover, such animal litter products generally have no provision for neutralizing or eliminating the unpleasant odors inherent to animal waste. Where such animal litter is formed of clay, the comparatively high weight thereof results in expensive shipping costs. Other animal litter products have been developing utilizing chorophyll-containing agents. Such animal litter generally provides effective oder control by means of the chlorophyll; however, this type of litter is prone to being tracked throughout the house by the animals. Applicant is aware of U.S. Pat. No. 3,286,691 and U.S. Pat. No. 3,425,397 directed to chlorophyll-containing animal litter.

SUMMARY OF THE INVENTION

The present invention relates to a process for preparing an animal litter, particularly useful as a cat litter. Such litter is prepared by mixing ground alfalfa with a gelatinizable carbohydrate such as flour, heating such mixture under pressure to bind the particles so as to effect the puffing thereof, pelletizing the puffed bound-together particles and finally drying the pellets. The alfalfa contains chlorophyll which provides effective odor control of animal waste. By mixing and pelletizing the alfalfa and flour and thereafter drying such pellets, an animal litter is provided which affords definite advantages over known animal litter. Optionally, a binder such as bentonite may be added to the alfalfa-flour mixture. Additionally, corn cob particles may be mixed with the dried pellets to aid in preventing sticking together of the pellets and affording additional absorbant qualities for the resulting litter.

Various objects and advantages of the present invention will become apparent from a consideration of the following description when taken in conjunction with the accompanying drawing.

BRIEF DESCRIPTION OF THE DRAWING

FIG. 1 is a diagrammatic view showing a preferred process for making animal litter embodying the present invention.

DESCRIPTION OF THE INVENTION

Referring to the upper portion of the drawing, there is shown at 10 a supply of preground and screened alfalfa. Preferably, the alfalfa should be screened through at least a 50 mesh screen. Adjacent alfalfa supply 10 is shown at 12 a supply of a gelatinizable carbohydrate which, preferably, is raw flour. The gelatinizable carbohydrate material can be any ground and/or refined plant product such as flour or starch from plant sources such as cerals, tubers or roots which gelatinizes in warm aqueous media. Generally, the flour or starch will be obtained from a grain ceral such as corn, rice, wheat, rye, oats, barley, sorghum, etc., and of these, raw corn, wheat, oats or rice flour are preferred because of ready availability and low cost. Other sources which can be used, however, include tuber and root products such as flours and/or starches of potatoes, cassava, arrowroot, etc., or sago starch which is the extract of the pith of ripe sago palm trees. The terms flour and starch are commonly used as synonyms in reference to the extracts of cassava, arrowroot and sago sources. With reference to the other products, however, flour generally means the pulverized or ground tuber or ceral products. As used herein, flour includes coarse ground products such as meals and farinas as well as finely ground and bolted products. Starch is commonly used to identify the refined products obtained by aqueous extraction of plant flours such as cereal and potato flour to remove the non-starch components such as the oils, fats, fibers, proteins, etc. Starches as used herein also includes chemically modified starches, for example, etherfied or esterfied starches prepared by treatment with acidic or alkaline agents.

Any of the aforementioned materials can be readily inspected for determination of its suitability for use in this invention by determining if the material will gelatinize. A simple inspection procedure is to stir or admix a sample of the material with water and hold the mixture at a temperature of about 120° to 160° F. for a period from 5 to about 20 minutes. Gelatinizable flours and starches, which are useful in this invention, will undergo visible swelling and expansion and will exhibit a loss of bifringence cross—visible with microscopic observation.

There is also optionally provided a supply 14 of a binder such as bentonite. It should be noted that some alfalfa suppliers add bentonite to the alfalfa when marketed. The amount of bentonite in the alfalfa-flour mixture may vary from 0%–10% by weight. The use of bentonite aids in binding together the alfalfa and flour.

The invention is described herein with reference to the use of flour which is the preferred gelatinizable carbohydrate material. In the succeeding description all or a portion, e.g., from 5 to 100 percent of the flour can be replaced with one or more of the aforementioned starches. A weight ratio of alfalfa to flour from about 75:25 to 25:75 is desirable. When starches are used, the proportions of the gelatinizable material relative to that of the alfalfa which is used can be at the lower range of proportions described since the starches are concentrated sources of the gelatinizable material. The starches also serve to enhance binding of the alfalfa and flour similar to the aforedescribed action of bentonite.

As indicated by directional line 16, the preground, screened alfalfa is moved from supply bin 10 to a blender 20, while flour is moved from supply bin 12 to blender 20 as indicated by line 22. Similarly, as indicated by the directional line 24, the material in supply bin 14 is moved into the same blender 20 when such material is utilized. Preferably, the blender 20 will be of the conventional ribbon type, as represented by that sold by Sprout-Waldron of Muncy, Pennsylvania or J. H. Day Co. of Cincinnati, Ohio. The blender 20 serves to thoroughly mix the dry, raw ingredients received from supply bins 10, 12 and 14.

From the blender 20, the mixed, dry ingredients are moved into the hopper 28 of an expander 30. The expander 30 is of conventional construction, as represented by the expander sold by Wenger Mfg. Co. of Sabetha, Kansas or Sprout-Waldron of Muncy, Pennsylvania. The expander 30 is essentially an extruder which, rather than compressing the ingredients received from blender 20, cooks such ingredients with steam and water under pressure and causes the particles of alfalfa and flour as well as any ingredients from supply 14 to bind together. The resulting product is extruded out of the right-hand end of the expander through a die 32. As the cooked product is forced out through such die, the internal pressure of the trapped super-heated steam causes such product to rapidly expand or puff-up thereby creating a porous texture. It should be noted that since the flour is gelatinized during cooking in the expander, the flour and alfalfa adhere together during and after such puffing. The resulting expanded porous extruded product is then formed into pellets as it leaves die 32 by a revolving knife in a conventional manner. A pellet diameter of about 3/32 inch has proven satisfactory.

As noted hereinabove, a mixture of 50% wheat and 50% corn flour is desirable, with the flour comprising about 50% of the total alfalfa-flour mixture. In this regard, it has been found that corn flour affords maximum expansion during the puffing operation, while wheat flour provides better adhesion. Where solely wheat flour is used, there may be a tendency for the pellets to become sticky. Where solely corn flour is used, the alfalfa and corn may not adhere together satisfactorily during the puffing operation.

The pellets emerging from the right-hand side of expander 30 enter the left-hand side of a conventional forced air drying oven 40 by means of a conveyor belt 42. The conveyor belt 42 moves the pellets through the length of oven 40 where such pellets emerge from the right-hand side thereof. The pellets are dried to about a 5% moisture within oven 40. From the right-hand end of conveyor belt 42, the dried pellets drop into a conventional screening box 44. Pellets of a predetermined size larger than the screen mesh of the screening box are transferred onto a conveyor belt 46 by means of a chute 48 positioned at the upper right-hand side of screening box 44. Pellets smaller than such predetermined size and pellet fragments are returned from screening box 44 through a second chute 50 positioned on the left-hand side of screening box 44. From chute 50, such undersized pellets and fragments are returned to blender 20 by suitable transfer means as indicated by the directional line 52.

The pellets dropped onto conveyor belt 46 may be packaged for sale as animal litter without further processing. Alternatively, such pellets may be moved to a second blender 54 as indicated by directional line 56. Blender 54 may be similar to blender 20 and is in communication with a supply 60 of ground, dried and sterilized corn cobs, as indicated by directional line 64. Preferably, the corn cobs will be ground to pass through a screen mesh of approximately 1/16 inch to ¼ inch. A weight ratio of corn cobs to pellets from about 75:25 to 25:75 is desirable, with a ratio of about 50:50 being quite satisfactory. From blender 54, the mixture of corn cobs and pellets will move to a packaging area, as indicated by directional line 66.

An animal litter prepared in accordance with the aforedescribed process will satisfactorily control the odor of animal waste matter, is unusually absorbant and is of a comparatively low density. Because of such low density, a minimum quantity is required to fill a package, and yet the quantity of packaged litter will afford substantially the same results as prior litter contained in a package of similar size. If corn cobs are not mixed with the pellets, such pellets may be flushed down the usual household toilet. With or without the addition of corn cobs, the animal litter is resistant to tracking by animals. Where corn cobs are mixed with the pellets, the tendency of the pellets to stick together in the litter box is reduced. Moreover, the corn cobs afford additional absorbant qualities.

Various modifications and changes may be made with respect to the foregoing detailed description without departing from the spirit of the present invention.

I claim:

1. A process of preparing an animal litter comprising the steps of:
    mixing ground chlorophyll-containing alfalfa with gelatinizable component selected from the class consisting of plant flours, starches and mixtures thereof in a weight ratio of alfalfa to gelatinizable component from about 75:25 to 25:75;
    heating the mixture of alfalfa and gelatinizable component under steam pressure to gelatinize the gelatinizable component and bind the particles of alfalfa and gelatinizable component together;
    expanding said bound-together particles into the atmosphere whereby the internal steam pressure of said bound-together particles puff said particles into an expanded, porous texture;
    pelletizing said puffed bound-together particles; and
    drying the pellets resulting from said pelletizing.

2. A process as set forth in claim 1 wherein bentonite is added to the mixture of alfalfa and gelatinizable component in an amount up to 10 percent thereof prior to said heating step.

3. A process as set forth in claim 1 wherein ground corn cobs are added to said pellets in a weight ratio of ground corn cobs to pellets from about 75:25 to 25:75.

4. A process as set forth in claim 1 wherein said gelatinizable component is a mixture of corn and wheat flours.

5. A process as set forth in claim 2 wherein said gelatinizable component includes a food starch.

6. A process as set forth in claim 3 wherein bentonite is added to the mixture of alfalfa and gelatinizable component in an amount up to 10 weight percent thereof prior to said heating step.

7. A process as set forth in claim 4 wherein said gelatinizable component includes a food starch.

8. A process as set forth in claim 6 wherein said flour is a mixture of corn and wheat flours.

9. A process of preparing an animal litter, comprising the steps of:
    mixing ground and screened chlorophyll-containing alfalfa with a gelatinizable flour selected in a weight ratio of alfalfa to flour from about 75:25 to 25:75;
    heating the mixture of alfalfa and flour by pressurized steam to gelatinize said flour and bind the particles of alfalfa and flour together;
    extruding said bound-together particles into the atmosphere to expand said bound-together particles into a puffed-up porous elongated mass;
    pelletizing said elongated mass; and
    drying the pellets resulting from said pelletizing.

10. A process as set forth in claim 9 wherein bentonite is added to the mixture of alfalfa and flour in an amount up to 10 weight percent thereof prior to said heating step.

11. A process as set forth in claim 9 wherein ground corn cobs are added to said pellets in a weight ratio of ground corn cobs to pellets from about 75:25 to 25:75.

12. A process as set forth in claim 9 wherein said flour is a mixture of corn and wheat flours.

13. A process as set forth in claim 10 wherein said food starch is also included in said mixture.

14. A process as set forth in claim 11 wherein bentonite is added to the mixture of alfalfa and flour in an amount up to 10 weight percent thereof prior to said heating step.

15. A process as set forth in claim 11 wherein said pellets and corn cobs are mixed in a ratio by weight of from about 75:25 to 25:75.

16. A process as set forth in claim 12 wherein said mixture also includes a food starch.

17. A process as set forth in claim 14 wherein said flour is a mixture of corn and wheat flours.

18. A homogeneous composition useful as an animal litter comprising an admixture of cooked alfalfa and gelatinized starch uniformally distributed one throughout the other to form said homogeneous composition in an expanded form.

19. An expanded pellet for use as an animal litter comprising a homogeneous dispersion of cooked alfalfa particles bound together with gelatinized starch.

20. A process for the production of a homogeneous expanded alfalfa-based animal litter composition comprising:

preparing an admixture comprising alfalfa and a starch source; extrusion cooking said admixture to form said homogeneous composition with said alfalfa and said starch uniformally distributed one throughout the other; and drying the finished product.

* * * * *